United States Patent Office 3,301,875

Patented Jan. 31, 1967

3,301,875
6-CHLORO-$\Delta^{3,5}$-STEROID DERIVATIVES AND PROCESS FOR THEIR MANUFACTURE Werner Fritsch, Neuenhain, Taunus, Werner Haede, Hofheim, Taunus, Heinrich Ruschig, Bad Soden, Taunus, and Ulrich Stache, Hofheim, Taunus, Germany, assignors to Farbwerke Hoechst Aktiengesellschaft vormals Meister Lucius & Bruning, Frankfurt am Main, Germany, a corporation of Germany No Drawing. Filed Sept. 21, 1964, Ser. No. 398,105
Claims priority, application Germany, Sept. 28, 1963, F 40,866
13 Claims. (Cl. 260—397.3)

It is known (H. Gross and J. Gloede, Ber., 96 (1963), page 1384) that aryl-alkyl-ketones as well as aliphatic and alicyclic ketones (for instance cyclohexanone) can be converted into the corresponding vinyl-monochlorides (for instance into 1-chloro-cyclohexene-1) by treating them with pyrocatechyl phosphorous trichloride.

Now we have found a process for the manufacture of 6-chloro-$\Delta^{3,5}$-steroid derivatives which comprises chlorinating 3,5-cyclo-6-oxo-androstanes, -pregnanes, -pregnenes or -oestranes in 6-position with a chlorinating agent, preferably with pyrocatechyl-phosphorous-trichloride, hydrolising in an acid medium ketal groups which may be present, and treating the dichlorine derivative with agents splitting off hydrogen chloride, preferably with tertiary bases showing a high boiling point or with alkali metal carbonates or alkaline earth metal carbonates in dimethylformamide.

The reaction takes the following course:

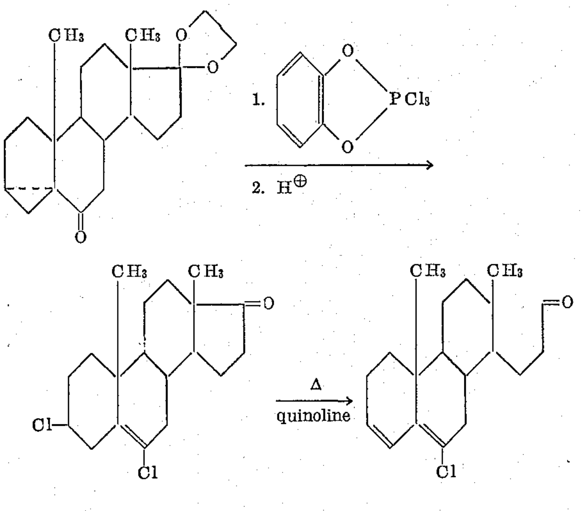

Other keto groups which might be present in the steroid molecule have to be suitably protected. It is particularly desirable previously to convert them into the corresponding ketals, and, if a 17$\alpha$,21-hydroxy-20-oxo side chain is present, into the corresponding ethylene-dioxy derivatives. Hydroxyl groups that may be present can be protected by acylation.

In carrying out the process, the 3,5-cyclo-6-oxo-androstane, -pregnane, -pregnene or -oestrane derivative is dissolved in a solvent inert to the chlorinating agent, for instance, benzene, toluene, dioxane, tetrahydrofurane or ether, if necessary likewise in a mixture of said solvents, and 1 to 3 mol-equivalents of the chlorinating agent, such, for instance, as pyro-catechyl-phosphorous trichloride or a solution thereof in one of the above-mentioned solvents is added, if necessary, with cooling. The reactants can likewise be reacted in their solid state.

The reaction which, in most cases, occurs with evolution of heat, is carried out at temperatures between zero and 100° C., preferably between 40 and 80° C. Generally, the reaction period varies between some minutes and several hours according to the temperature applied.

For isolating the 3,6-dichloro-$\Delta^5$-steroid derivatives obtained at first, the reaction mixture is stirred into a sufficient amount of water, if the solvents used are miscible with water. When solvents immiscible with water are used, the reaction mixture is thoroughly shaken for some time with water. The whole is then neutralized with bases, preferably with inorganic bases such as aqueous alkali metal bicarbonate solution, alkali metal carbonate solutions, alkali metal hydroxides or alkaline earth metal hydroxides. The dichloro-steroid present in the mixtures is subsequently extracted with suitable solvents, preferably with benzene, ether or methylene-chloride, washed with water and the organic phase is evaporated in dryness.

In the second phase of the process claimed, the 3,6-dichloro-$\Delta^5$-steroid derivatives obtained are suitably treated for half an hour to 2 hours with a tertiary base of the quinoline series having a high boiling point, advantageously with quinoline itself, at an elevated temperature, suitably at the reflux-temperature of the base used. In order to be worked up, the reaction mixture is taken up in an organic solvent, immiscible with water and washed with water and hydrochloric acid. By concentrating the solvent the crystalline product is obtained.

Another method for splitting off hydrogen chloride consists in that the 3,6-dichloro-$\Delta^5$-steroid is reacted in dimethyl-formamide for half an hour to 2 hours at temperatures between 80° C. and the reflux-temperature of the dimethyl-formamide with alkali metal carbonates or alkaline earth metal carbonates, preferably lithium carbonate or likewise calcium carbonate.

As starting substances for the process according to the present invention, the folowing compounds can be used:

17$\beta$-acyloxy-6-oxo-3,5-cyclo-androstanes,
17$\beta$-acyloxy-17$\alpha$-alkyl-6-oxo-3,5-cyclo-androstanes,
17$\beta$-acetoxy-17$\alpha$-methyl-6-oxo-3,5-cyclo-androstane,
17$\beta$-acetoxy-17$\alpha$-alkyl-6-oxo-3,5-cyclo-androstanes,
17$\beta$-acyloxy-17$\alpha$-ethinyl-6-oxo-3,5-cyclo-androstanes,
20-ethylene-dioxy-6-oxo-3,5,-cyclo-pregnane,
20-ethylene-dioxy-6-oxo-3,5-cyclo-$\Delta^{16}$-pregnene,
17,20:20,21-bis-methylene-dioxy-6-oxo-3,5-cyclo-pregnane,
17,20:20,21-bis-methylene-dioxy-6-oxo-3,5-cyclo-$\Delta^{9(11)}$-pregnene,
17$\alpha$-acyloxy-20-ethylene-dioxy-6-oxo-3,5-cyclo-pregnanes,
17-ethylene-bisoxy-6-oxo-3,5-cyclo-androstane,
17-ethylene-bisoxy-6-oxo-3,5,cyclo-oestrane,
17$\beta$-acyloxy-17$\alpha$-ethinyl-6-oxo-3,5-cyclo-oestranes,
17$\beta$-acyloxy-17$\alpha$-alkyl-6-oxo-3,5-cyclo-oestranes,
17$\alpha$-acyloxy-6,20-dioxo-3,5-cyclo-pregnanes,
17$\alpha$-acyloxy-16-methyl-6-oxo-3,5-cyclo-pregnanes,
17$\alpha$-acyloxy-16-methylene-6-oxo-3,5-cyclo-pregnanes,
6,20-dioxo-3,5-cyclo-pregnane.

The above-mentioned 3,5-cyclo compounds used as starting materials can be obtained according to the process described by Julia et al., in Bull. Soc. Chim. (1960), pages 297–299, and the procedures disclosed in U.S. Patent 3,094,523.

The products obtained according to the process of the present invention, depending upon whether they belong to the androstane- or the pregnane-series, show anabolic or gestagenic action when orally administered. Moreover, they are interesting intermediate products for the production of medicaments.

The following examples serve to illustrate the invention but they are not intended to limit it thereto:

EXAMPLE 1

(a) *3,6-dichloro-$\Delta^5$-androstene-17-one*

6.4 grams of pyro-catechyl-phosphorus-trichloride are added to 4.5 grams of 3,5-cyclo-6-oxo-17-ethylene-dioxy-androstane with exclusion of humidity. The melt which forms with effervescence and heating is at first abandoned for 30 minutes, heated then for 5 minutes to 80° C. and after addition of 20 milliliters of anhydrous toluene to the reaction mixture, it is heated for a further 10 minutes to 70° C. The reaction mixture is then stirred into 100 milliliters of water and, in order to achieve the splitting of the ketal, the reaction mixture is shaken for 5 to 10 minutes. Upon neutralization with aqueous bicarbonate solution it is extracted with benzene, washed with water, dried over sodium sulfate and concentrated to dryness under reduced pressure. After recrystallization from a a mixture of ether and methanol, 2.0 grams of 3,6-dichloro-$\Delta^5$-androstene-17-one are obtained which melt at 177–178° C.

(b) *6-chloro-$\Delta^{3,5}$-androstadiene-17-one*

A solution of 4.6 grams of 3,6-dichloro-$\Delta^5$-androstene-17-one in 100 milliliters of quinoline is heated to the boil for 70 minutes under nitrogen, with exclusion of humidity and with reflux.

50 milliliters of benzene are added to the cooled reaction mixture which is washed until showing a neutral reaction successively by means of hydrochloric acid, sodium-bicarbonate and water, dried over sodium sulfate and evaporated to dryness under reduced pressure. Upon recrystallization from a mixture of ether and petroleum ether 2.56 grams of 6-chloro-$\Delta^{3,5}$-androstadiene-17-one are obtained which melt at 145–146° C. (Kofler heater).

(a) *3,6-dichloro-$\Delta^5$-pregnene-17α-ol-20-one-17-acetate*

7.44 grams of 3,5-cyclo-6-oxo-pregnane-17α-ol-20-one-17-acetate are dissolved in a mixture of 100 milliliters of benzene and 10 milliliters of methylene-chloride and a solution of 5.9 grams of pyro-catechyl-phosphorus-trichloride in 60 cc. of benzene is added in one portion at room temperature. After stirring for 3 hours at 20° C. the reaction mixture is washed with water and diluted sodium bicarbonate solution, dried over sodium sulfate and evaporated to dryness under reduced pressure. After recrystallization from methanol 2.5 grams of 3,6-dichloro-$\Delta^5$-pregnene-17α-ol-20-one-17-acetate are obtained which melt at 258–259° C. (Kofler heater).

If, after a reaction period of 3 hours a moderate stream of dry hydrogen chloride is introduced for 15 minutes into the reaction mixture while the latter is cooled with ice, and the reaction mixture thus obtained is then washed with water and sodium bicarbonate solution until showing a neutral reaction, 8.1 grams of 3,6-dichloro-$\Delta^5$-pregnene-17α-ol-20-one-17-acetate are obtained which melt at 258–259° C. (Kofler heater).

(b) *6-chloro-$\Delta^{3,5}$-pregnadiene-17α-ol-20-one-17-acetate*

A solution of 1.24 grams of 3,6-dichloro-$\Delta^5$-pregnene-17α-ol-20-one-17-acetate in 12.5 milliliters of dimethyl-formamide is added under nitrogen to a boiling suspension of 1.24 grams of lithium carbonate in 8.5 milliliters of dimethyl-formamide and heated to the boil for 3 hours under reflux. Any unreacted lithium carbonate is filtered off with suction in hot state, the mass is washed with a small amount of dimethyl-formamide and the filtrate is crystallized by sprinkling it with water. The crystals are filtered off, washed with water and recrystallized from a mixture of methylene-chloride and methanol. 880 milligrams of 6-chloro-$\Delta^{3,5}$-pregnadiene-17α-ol-20-one-17-acetate are obtained which melt at 218–219° C.

$\lambda$ max.=237.5; 244.3; 252 mμ, $\epsilon$=19,900, 21,500, 13,100 (in methanol).

EXAMPLE 3

(a) *3,6-dichloro-$\Delta^5$-pregnene-20-one*

3 grams of 3,5-cyclo-pregnane-6,20-dione are dissolved with 3 grams of pyro-catechyl-phosphorus trichloride in 3 cc. of benzene. Upon decay of the reaction, the reaction mixture is still heated for 5 minutes to 50° C. 5 cc. of a solution of hydrochloric acid and glacial acetic acid of 10% strength is then added and the whole is allowed to stand for 30 minutes at room temperature. The solution is then diluted by means of methylene chloride, shaken for a short period with cold diluted sodium hydroxide solution, dried with $Na_2SO_2$ and evaporated to dryness under reduced pressure. From methanol there are obtained 2.1 grams of 3,6-dichloro-$\Delta^5$-pregnane-20-one of a melting point of 124° C.

(b) *6-chloro-$\Delta^{3,5}$-pregnadiene-20-one*

By treatment of 0.6 gram of 3,6-dichloro-$\Delta^5$-pregnene 20-one with lithium carbonate according to the conditions described in Example 2, there is obtained 0.21 gram of 6-chloro-$\Delta^{3,5}$-pregnadiene-20-one of a melting point of 124° C. The mixed melting point of the substance with the starting material gives a depression and is identified by analysis and infrared spectrum.

EXAMPLE 4

(a) *3,6-dichloro-16-methylene-$\Delta^5$-pregnene-17α-ol-20-one-acetate*

4 grams of 3,5-cyclo-16-methylene-pregnane-17α-ol-6,20-dione-acetate are mixed with 3.1 grams of pyro-catechylphosphorus trichloride and 3 cc. of benzene. Dissolution occurs with evolution of heat. The mixture is then heated for 20 minutes to 60° C. and after addition of 4 cc. of a solution of hydrochloric acid and glacial acetic acid of 3% strength it is again heated for 1 hour to 35° C. The substance is worked up as described in Example 3.

Yield: 2.5 grams; melting point 237° C.

(b) *6-chloro-16-methylene-$\Delta^{3,5}$-pregnadiene-17α-ol-20-one-acetate*

By treatment of 1.8 grams of 3,6-dichloro-16-methylene-$\Delta^5$-pregnene-17α-ol-20-one-acetate with lithium carbonate as described in Example 2, 1.4 grams of 6-chloro-16-methylene-$\Delta^{3,5}$-pregnadiene-17α-ol-20-one-actate is obtained. Melting point 188° C.

EXAMPLE 5

(a) *3,6-dichloro-17α-ethinyl-$\Delta^5$-androstene-17β-ol-acetate*

4 grams of 17α-ethinyl-3,5-cyclo-androstane-17β-ol-6-one-acetate are heated with 2.4 grams of pyro-catechyl-phosphorus trichloride in 6 cc. of benzene for 90 minutes to 60° C. Upon addition of 6 cc. of a solution of hydrochloric acid and glacial acetic acid of 5% strength the mixture is again heated for 90 minutes to 40° C. It is worked up as described in Example 3. From isopropyl ether there are obtained 1.7 grams of 3,6-dichloro-17α-ethinyl - $\Delta^5$ - androstene - 17β-ol-acetate. Melting point 170° C.

(b) *6-chloro-17α-ethinyl-$\Delta^{3,5}$-androstadiene-17β-ol-acetate*

By treatment of 0.3 gram of 3,6-dichloro-17α-ethinyl-$\Delta^5$-androstene-17β-ol-acetate with lithium carbonate as described in Example 2, 0.13 gram of 6-chloro-17α-ethinyl-$\Delta^{3,5}$-androstadiene-17β-ol-acetate is obtained. Melting point 158° C.

EXAMPLE 6

(a) *3,6-dichloro-17α-ethinyl-$\Delta^5$-oestrene-17β-ol-acetate*

0.3 gram of 17α-ethinyl-3,5-cyclo-oestrane-17β-ol-6-one-acetate is heated with 0.26 gram of pyro-catechyl-phosphorus trichloride in 0.3 cc. of benzene for 20 minutes to 60° C. After addition of 0.3 cc. of a solution of hydrochloric acid and glacial acetic acid of 7% strength it is again heated for 1 hour to 40° C. After working up as described in Example 3 and crystallization from methanol 0.14 gram of 3,6-dichloro-17α-ethinyl-$\Delta^5$-oestrene-17β-ol-acetate is obtained. Melting point: 160° C.

(*b*) *6-chloro-17α-ethinyl-$\Delta^{3,5}$-oestradiene-17β-ol-acetate*

By treating 50 milligrams of 3,6-dichloro-17α-ethinyl-$\Delta^5$-oestrene-17β-ol-acetate with lithium carbonate as described in Example 2, there are obtained from isopropylether 31 milligrams of 6-chloro-17α-ethinyl-$\Delta^{3,5}$-oestradiene-17β-ol-acetate, which after having been recrystallized from methanol melt at 181° C.

We claim:

1. Process for the manufacture of 6-chloro-$\Delta^{3,5}$-steroid derivatives which comprises reacting a compound selected from the group consisting of 3,5-cyclo-6-oxo-androstanes, 3,5-cyclo-6-oxo-pregnanes, 3,5-cyclo-6-oxo-$\Delta^{9(11)}$-pregnenes or 3,5-cyclo-6-oxo-$\Delta^{16}$-pregnenes and 3,5-cyclo-6-oxo-oestranes with pyrocatechyl-phosphorus trichloride and subsequently treating the 3,6-dichloro derivatives thus obtained at elevated temperature with a high boiling tertiary base of the quinoline series or with an alkali metal carbonate or alkaline earth metal carbonate in dimethyl-formamide to split off hydrogen chloride.

2. Process for the manufacture of 6-chloro-$\Delta^{3,5}$-steroid derivatives which comprises reacting a compound selected from the group consisting of 3,5-cyclo-6-oxo-androstanes, 3,5-cyclo-6-oxo-pregnanes, 3,5-cyclo-6-oxo-$\Delta^{9(11)}$-pregnenes or 3,5-cyclo-6-oxo-$\Delta^{16}$-pregnenes and 3,5-cyclo-6-oxo-oestranes with pyrocatechyl-phosphorus trichloride hydrolysing any ketal groups in an acid medium and subsequently treating the 3,6-dichloro derivatives thus obtained at elevated temperature with a high boiling tertiary base of the quinoline series or with an alkali metal carbonate or alkaline earth metal carbonate in dimethyl-formamide to split off hydrogen chloride.

3. Process as claimed in claim 1 wherein the splitting off of hydrogen chloride is carried out by treatment with quinoline.

4. Process as claimed in claim 2 wherein the splitting off of hydrogen chloride is carried out by treatment with quinoline.

5. Process as claimed in claim 1 wherein the splitting off of hydrogen chloride is carried out by treatment with an alkali metal carbonate in dimethyl-formamide.

6. Process as claimed in claim 2 wherein the splitting off of hydrogen chloride is carried out by treatment with an alkali metal carbonate in dimethyl-formamide.

7. Process as claimed in claim 1 wherein the splitting off of hydrogen chloride is carried out by treatment with an alkaline earth metal carbonate in dimethyl-formamide.

8. Process as claimed in claim 2 wherein the splitting off of hydrogen chloride is carried out by treatment with an alkaline earth metal carbonate in dimethyl-formamide.

9. Process as defined in claim 5 wherein the alkali metal carbonate is lithium carbonate.

10. Process as defined in claim 6 wherein the alkali metal carbonate is lithium carbonate.

11. 6-chloro-$\Delta^{3,5}$-androstadiene-17-one.

12. 6-chloro-17α-ethinyl-$\Delta^{3,5}$-androstadiene-17β-ol acetate.

13. 6-chloro-17α-ethinyl-$\Delta^{3,5}$-oestradiene-17β-ol acetate.

No references cited.

LEWIS GOTTS, *Primary Examiner.*

ELBERT L. ROBERTS, *Assistant Examiner.*